Patented Apr. 2, 1940

2,196,033

UNITED STATES PATENT OFFICE 2,196,033

MOLDING COMPOUND AND MOLDED ARTICLE OF MANUFACTURE

Hans Schuhmann, Berlin-Frohnau, Germany, assignor to General Electric Company, a corporation of New York No Drawing. Application October 1, 1936, Serial No. 103,672. In Germany October 17, 1935

6 Claims. (Cl. 260—38)

The present invention relates broadly to molding compounds and molded articles of manufacture and to methods of making the same. More particularly it relates to, and has a main object to provide an artificial body or composite mass containing synthetic resinous composition, which body or mass possesses improved mechanical and electrical properties. Specifically, the invention is concerned with molding compounds comprising moldable heat-hardenable synthetic resin, e. g., phenol-aldehyde resin, and filaments or threads of glass having a diameter not exceeding 0.02 millimeter distributed therethrough to increase the mechanical strength of the hardened resin. The molded articles of manufacture have mechanical strength above that of articles similarly made with the same kind of synthetic resinous composition but filled with glass filaments or threads having a diameter substantially exceeding 0.02 millimeter.

It is known that synthetic resins, such as the phenol-aldehyde resins, are rather brittle and for that reason are not very resistant against mechanical stresses. This disadvantage heretofore has been met by the fact that the most widely different filling materials were incorporated in the synthetic resin, so that in this manner a considerable improvement of the mechanical properties and, in certain cases, of the electrical properties was obtained. Such filling materials often were of an organic nature. In the first place, sawdust and paper fibers were used, and these have been utilized in large quantities because of their low cost. Cotton, hemp and linen fibers and woven materials were utilized, and by their use a considerable increase of the impact bending strength was obtained. Inorganic filling materials were used, such as barium sulphate, zinc oxide, talcum, asbestos, and so forth. The use of asbestos as a filling material in bodies pressed from synthetic resins resulted from the necessity of creating products which are particularly resistant to chemical influences, such as acids, and which further have a high insulating effect and are not inflammable. As a filling material for bodies pressed from synthetic resins numerous attempts heretofore have been made to use, instead of asbestos, glass, for instance, the product known in the trade as "glass wool" and which, as is well known, is composed of glass threads. However, such pressed bodies showed, up to the present, the great disadvantage of an insufficient mechanical strength so that a relatively brittle material, which did not meet the requirements, was the result.

It was found that a material with the required high electrical values and which, surprisingly, has mechanical properties above expectations (e. g., substantially increased mechanical strength) is obtained if the threads or filaments of glass incorporated into the synthetic resin as filler therefor has a diameter which does not exceed 0.02 millimeter. This is a diameter much smaller than that of the ordinary "glass wool" of commerce, and, in practicing this invention, is critical. Such a material, as a filler for synthetic resin molding compounds, makes possible the use of the resulting mass to a much greater extent than previously because of the superior properties of the end-product.

In practicing this invention it is advantageous to use instead of smooth, fine threads, threads which are rotated or twisted around their own axes. Use of fillers consisting substantially of twisted glass threads having a diameter not exceeding 0.02 millimeter causes further improvement in the pressed bodies (hardened compounds), which improvement results, among other things, by reason of the more intimate association between the glass threads and the binding medium. Such synthetic resinous compositions may be used as, for example, alkyd resins, aniline-formaldehyde resins, phenol-aldehyde resins, and the like. The compounds can be shaped and hardened in known manner under pressure and heat, thereby converting the resin to the infusible and insoluble state. The molding compounds filled with glass filaments or threads having a diameter not exceeding 0.02 millimeter satisfy all conditions which are to be met by such compounds, for instance in electrical applications of the molded articles. As compared to the asbestos-containing compounds, these new glass-filled compounds have the further advantage that they are not hygroscopic.

From the foregoing it will be seen that a molded article comprising the insoluble and infusible product of a heat and pressure treatment of a molding compound (moldable composition) consisting essentially of heat-hardenable synthetic resin, e. g., phenol-aldehyde resin, and filaments or threads of glass having a diameter not exceeding 0.02 millimeter as a filler therefor has definite advantages over similar molded resinous articles in which conventional fillers are utilized.

What I claim as new and desire to secure by Letters Patent of the United States is:

1. A molding compound comprising moldable synthetic resin adapted to be hardened under heat and pressure and filaments of glass having a diameter not exceeding 0.02 millimeter distributed therethrough to increase the mechanical strength of the hardened resin.

2. A molding compound comprising moldable, heat-hardenable phenol-aldehyde resin and a filler therefor consisting substantially of twisted glass threads having a diameter not exceeding 0.02 millimeter, said filler substantially increasing the mechanical strength of the hardened compound above that obtained with the same kind of phenol-aldehyde resin filled with twisted glass threads having a diameter substantially exceeding 0.02 millimeter.

3. A molded article of manufacture comprising the infusible and insoluble product of a heat and pressure treatment of a molding compound comprising heat-hardenable synthetic resinous composition and filaments of glass having a diameter not exceeding 0.02 millimeter as a filler therefor, said molded article having mechanical strength above that of a molded article similarly made with the same kind of resinous composition but filled with glass filaments having a diameter substantially exceeding 0.02 millimeter.

4. A molded article of manufacture comprising the infusible and insoluble product of a heat and pressure treatment of a moldable composition consisting essentially of heat-hardenable phenol-aldehyde resin and twisted glass threads having a diameter not exceeding 0.02 millimeter as a filler therefor, said molded article having mechanical strength above that of a molded article similarly produced from the same kind of phenol-aldehyde resin but filled with twisted glass threads having a diameter substantially exceeding 0.02 millimeter.

5. A method of increasing the mechanical strength of an article of manufacture obtained by molding under heat and pressure a moldable composition comprising heat-hardenable phenol-aldehyde resin, which comprises incorporating into the said composition, as a filler for the said resin, filaments of glass having a diameter not exceeding 0.02 millimeter twisted about their own axes.

6. A method of increasing the mechanical strength of an article of manufacture obtained by molding under heat and pressure a moldable composition comprising heat-hardenable synthetic resin, which comprises incorporating into the said composition, as a filler for the said resin, filaments of glass having a diameter not exceeding 0.02 millimeter.

HANS SCHUHMANN.